United States Patent
Chute

[11] 3,862,767
[45] *Jan. 28, 1975

[54] VEHICLE SAFETY APPARATUS HAVING EXPANDABLE CONFINEMENT

[75] Inventor: Richard Chute, Huntington Wood, Mich.

[73] Assignee: Eaton Corporation, Cleveland, Ohio

[ * ] Notice: The portion of the term of this patent subsequent to Feb. 1, 1989, has been disclaimed.

[22] Filed: Oct. 22, 1971

[21] Appl. No.: 191,656

Related U.S. Application Data

[63] Continuation of Ser. No. 849,394, Aug. 12, 1969, Pat. No. 3,638,964.

[52] U.S. Cl. .......................................... 280/150 AB
[51] Int. Cl. .............................................. B60r 21/00
[58] Field of Search .......... 280/150 AB; 137/38, 67, 137/514.3, 514.7

[56] References Cited
UNITED STATES PATENTS

| | | | |
|---|---|---|---|
| 1,974,533 | 9/1934 | Evans | 137/514.3 |
| 2,436,396 | 2/1948 | McCasun | 102/73 |
| 2,649,311 | 8/1953 | Hetrick | 280/150 AB |
| 2,917,076 | 12/1959 | Ramo | 137/514.3 |
| 3,197,234 | 7/1965 | Bertrand | 280/150 AB |
| 3,460,853 | 8/1969 | Chute | 280/150 AB |
| 3,567,245 | 3/1971 | Ekstrom | 280/150 AB |
| 3,586,033 | 6/1971 | Hieber | 137/514.7 |
| 3,638,964 | 2/1972 | Chute | 280/150 AB |

Primary Examiner—Kenneth H. Betts
Assistant Examiner—David M. Mitchell
Attorney, Agent, or Firm—Teagno & Toddy

[57] ABSTRACT

An improved safety apparatus for protecting an occupant of a vehicle during the occurrence of an accident includes an expandable confinement having a collapsed condition and an expanded condition for restraining an occupant of a vehicle during an accident. A unitary assembly for effecting expansion of the confinement includes a percussion actuated explosive valve which is impacted with an actuator in response to the occurrence of an accident to effect operation of the valve to an open condition. Opening the valve enables fluid to flow from a source of fluid to the confinement to effect expansion of the confinement. The actuator can be either a mass which is impacted against the flow of in response to the occurrence of an accident or a fixed member against which the valve is impacted. The flow fluid from the source of fluid is at least partially stabilized by a flow regulator assembly to thereby tend to eliminate "peak" or excessively high rates of expansion of the confinement.

7 Claims, 9 Drawing Figures

VEHICLE SAFETY APPARATUS HAVING EXPANDABLE CONFINEMENT

This application is a Continuation of my copending application Ser. No. 849,394 filed Aug. 12, 1969 which issued Feb. 1, 1972 as U.S. Pat. No. 3,638,964 and which is assigned to the assignee of the present invention.

The present invention relates to a vehicle safety apparatus including an expandable confinement having a collapsed inoperative condition and an expanded operative condition for protecting an occupant of a vehicle during an accident.

A known safety apparatus for protecting an occupant of a vehicle includes an expandable confinement having a collapsed inoperative condition and an expanded operative condition. A sensor assembly mounted on a forward portion of the vehicle is operated in response to the occurrence of an accident. A valve in the passenger compartment of the vehicle is operated to an open condition in response to operation of the sensor assembly to enable fluid to flow from a fluid reservoir into the confinement to effect expansion of the confinement. Although several different embodiments of this safety apparatus are known, one embodiment is illustrated in U.S. Pat. No. 3,414,292.

This known safety apparatus effects expansion of the confinement in a manner wherein the fluid flow into the confinement tends to rapidly reach a maximum value and then rapidly decrease. In other words, while the flow of fluid into the confinement takes place over a fixed time period, the majority of the flow of fluid into the confinement takes place during a relatively short time at the beginning of the fixed time period with a minimal amount of flow taking place during the rest of the fixed time period. Associated with the rapid fluid flow rate is a high noise level. Moreover, the initial impact between the confinement and the occupant may be relatively severe as the initial expansion of the confinement is quite rapid.

Accordingly, an object of the present invention is to provide a new and improved safety apparatus for a vehicle including an expandable confinement and a compact unitary assembly for effecting expansion of the confinement without subjecting the occupant of the vehicle to high noise levels or large impact forces as discussed hereinabove.

Another object of the present invention is to provide a new and improved safety apparatus for protecting an occupant of a vehicle during an accident including an expandable confinement having a collapsed condition and an expanded condition for restraining an occupant of the vehicle during an accident, a fluid reservoir containing a supply of fluid therein, a percussion actuated explosive valve for releasing the fluid from the reservoir, and a control valve for controlling the flow of the fluid after it is released from the reservoir, and wherein the control valve effects expansion of the confinement in a predetermined manner so that the noise level associated with expansion and the initial impact between the confinement and the occupant are minimized.

A further object of the present invention is to provide a new and improved safety apparatus as defined in the next preceding object wherein the control valve includes means for retarding operation of the control valve to an open condition.

Still another object of the present invention is to provide a new and improved safety apparatus as defined in the next preceding object wherein the retarding means includes a chamber having substantially incompressible fluid therein and wherein movement of the valve tends to decrease the size of the chamber and force the fluid out of the chamber through a restricted outlet.

A further object of the present invention is to provide a new and improved safety apparatus for protecting an occupant of a vehicle during an accident including an expandable confinement having a collapsed inoperative condition and an expanded operative condition for restraining movement of an occupant during the occurrence of an accident, a fluid reservoir having a supply of pressurized fluid therein, and a percussion actuated explosive valve for releasing the fluid from the reservoir to effect expansion of the confinement to its operative condition.

Still another object of the present invention is to provide a new and improved safety apparatus as defined in the next preceding object further including a mass movable in response to changes in momentum of the vehicle caused by an accident and wherein movement of the mass effects actuation of the percussion actuated explosive valve.

A still further object of the present invention is to provide a new and improved safety apparatus as defined in the next preceding object wherein the sensor mass includes the fluid reservoir and the percussion actuated explosive valve is carried by the fluid reservoir so that movement of the fluid reservoir in response to a change in momentum of the vehicle effects engagement of the explosive valve with an actuator operable to effect actuation of the explosive valve and release of the fluid from the reservoir.

Another object of the present invention is to provide a new and improved safety apparatus for protecting an occupant of a vehicle during an accident including an expandable confinement having a collapsed inoperative condition and an expanded operative condition for restraining movement of the occupant during an accident, a fluid supply operable to provide a supply of fluid to effect expansion of the confinement to its operative condition, and control means for controlling the flow of fluid from the supply to thereby control the rate of expansion of the confinement.

Still another object of the present invention is to provide a new and improved safety apparatus as defined in the next preceding object wherein the control means includes a control valve which is operable to an open condition under the influence of fluid flowing from the supply of fluid and a means for retarding operation of the control valve to the open condition to effectively control the flow of fluid into the open confinement.

Still further objects and advantages of the present invention will become apparent from the following description and the accompanying drawings in which similar reference numerals are employed to designate corresponding parts throughout the several views, and in which.

The present invention relates to a vehicle safety apparatus for protecting an occupant of the vehicle during an accident. The safety apparatus includes an expandable confinement having a collapsed condition and an expanded condition in which it restrains movement of the occupant during an accident. A source of fluid, a fluid reservoir in the specific illustrated embodiments of the invention, supplies fluid to the interior of the confinement upon the occurrence of an accident to effect expansion of the confinement. A percussion actuated explosive valve is disposed on the fluid reservoir and is operable to allow fluid to flow from the reservoir upon the occurrence of an accident. The percussion actuated explosive valve is associated with an actuator mass which moves in response to a change in momentum of the vehicle caused by an accident to effect actuation of the percussion actuated explosive valve. Actuation of the explosive valve results in a flow of fluid from the fluid reservoir toward the confinement. Suitable flow control means are provided to retard the flow of fluid into the interior of the confinement to control the rate of expansion of the confinement.

Figure 1:
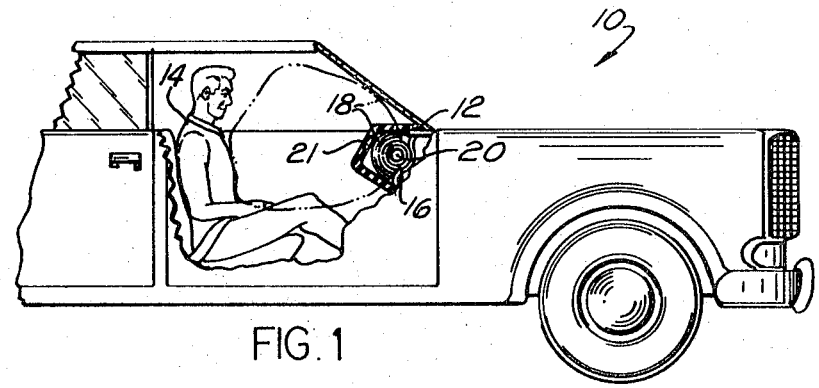
FIG. 1 is a schematic illustration of a safety apparatus forming a specific preferred embodiment of the present invention, the safety apparatus includes a confinement which is shown in solid lines in a collapsed condition and in dashed lines in an expanded condition.

As illustrated in FIG. 1, an automotive vehicle 10 is equipped with safety apparatus 12 as contemplated by the present invention to protect an occupant 14 of the vehicle. The safety apparatus 12 includes a suitable fluid supply, a fluid reservoir 16 in the specific illustrated embodiment of the invention. Upon the occurrence of an accident, a flow of fluid is provided from the reservoir 16 to effect expansion of the confinement 18. The confinement 18 is shown in its collapsed condition in full lines and in its expanded operative condition for restraining movement of the occupant in dashed lines in FIG. 1. A diffuser tube 20 is provided for directing the flow of fluid into the confinement 18. Fluid flows from the fluid supply 16 into the diffuser tube 20 and is directed throughout the interior of the confinement 18 by a plurality of holes located in the diffuser tube to effect a rapid expansion of the confinement 18. Although the safety apparatus as illustrated in FIG. 1 is located in the dashboard 21 to protect an occupant located in the front seat of the vehicle, it should be readily apparent that the safety apparatus could be located in other positions within the vehicle, such as in the back of the front seat, to protect an occupant seated in the rear of the vehicle.

Figure 2:
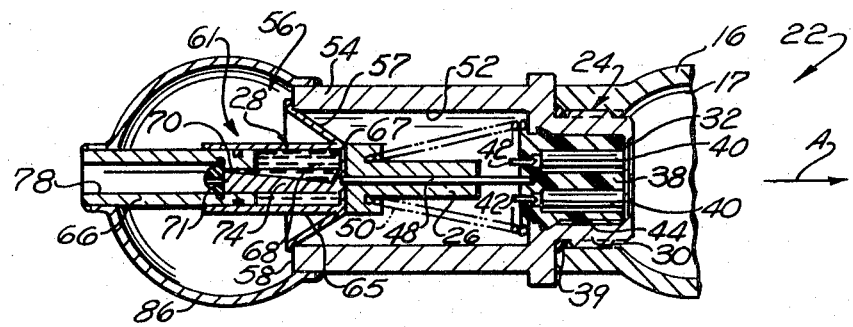
FIG. 2 illustrates a unitary assembly for establishing a flow of fluid in response to the occurrence of an accident, the assembly being shown in an unoperated condition.

A unitary assembly 22 for establishing a flow of fluid from the reservoir 16 in response to the occurrence of an accident is illustrated in its unoperated condition in FIG. 2. The assembly 22 includes the fluid reservoir 16 and a percussion actuated explosive valve 24 disposed on one end thereof. Associated with the percussion actuated explosive valve 24 is an actuator mass 26 which is movable in response to a change in momentum of the vehicle to effect actuation of the explosive valve. Suitable flow control means, which as the flow regulator or flow control valve assembly 28 is provided to at least partially stabilize the flow of fluid into the confinement 18. This stabilized flow of fluid expands the confinement 18 at a relatively uniform rate without excessively high instantaneous or "peak" rates of expansion.

The fluid reservoir 16 contains a supply of fluid 17 therein and is normally sealed to prevent the flow of fluid therefrom by the percussion actuated explosive valve 24. The fluid 17 in the fluid reservoir 16 is under pressure so that operation of the explosive valve 24 from the closed condition of FIG. 2 to the open condition of FIG. 3 enables fluid to flow from the interior of the fluid reservoir 16 through the valve to the interior of the expandable confinement 18. The fluid 17 stored in the reservoir 16 may be of any suitable fluid such as carbon dioxide.

Figure 5:
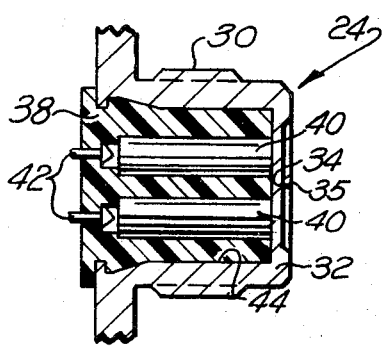
FIG. 5 is an enlarged view of a percussion activated explosive valve of the unitary assembly of FIG. 2.

The percussion actuated explosive valve 24, more fully illustrated in FIG. 5, includes a valve body 30. The valve body 30 has a suitable end portion 32 which is mounted so as to be disposed toward the interior of the fluid reservoir 16. The end portion 32 of the valve body includes a preweakened area 34 thereon. The preweakened area 34 contains a plurality of grooves 35 therein so that upon activation of the percussion actuated explosive valve 24, the preweakened area 34 will be ruptured to form an opening 36 (FIG. 3) through which fluid flows from the fluid reservoir 16. The formation of the opening 36 is more fully described in application Ser. No. 730,024 filed May 17, 1968 by George Ekstrom, now U.S. Pat. No. 3,567,245.

The valve body 30 defines a chamber 44 with a filler material 38 disposed therein. Preferably, the filler material comprises a low shear strength non-compressible elastomer filler. Disposed within the filler is an explosive means in the form of a pair of percussion actuated detonators 40. A pair of firing pins or actuator members 42 are suitably located relative to the detonators 40 so that a striking or impacting with the firing pins 42 effects actuation of the detonators 40. Although the illustrated embodiment of the present invention includes a pair of percussion actuated detonators 40 and a pair of firing pins 42, it should be realized that a single detonator and a single firing pin could be utilized. However, by providing a pair of detonators and a pair of firing pins, an impact on either one or both of the firing pins 42 is operable to initiate actuation of the detonators 40.

Figure 3:
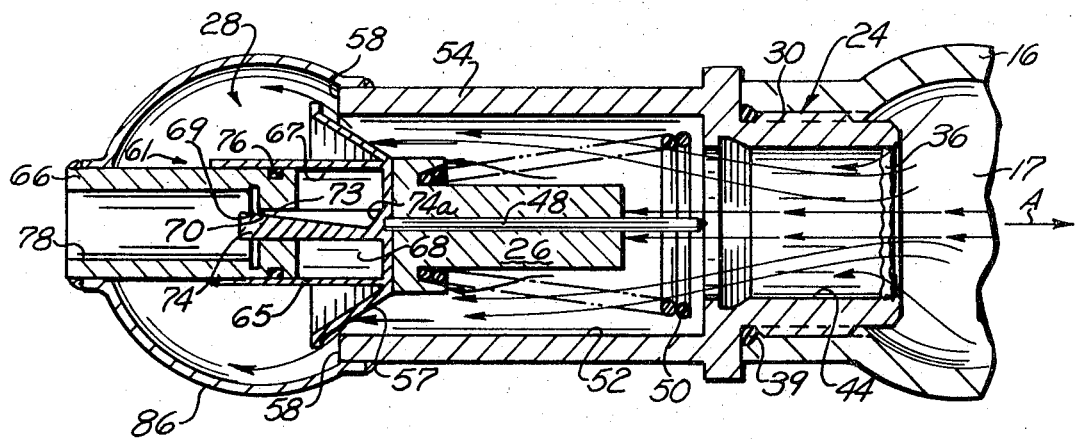
FIG. 3 is an enlarged view similar to FIG. 2 and in which the unitary assembly is shown in an operated condition.

Upon actuation of the explosive means or detonators 40, the non-compressible elastomer filler 38 is essentially disintegrated and the preweakened area 34 of the end 32 of the valve body 30 is ruptured along the grooves 35 therein. The rupture of the preweakened area 34 and the disintegration of the filler material 38 allows fluid to flow from the fluid reservoir 16 through the opening 36 toward the confinement 18 to effect expansion thereof. FIG. 3 illustrates the percussion actuated explosive valve 24 in the open condition and illustrates the flow of fluid 17 from the fluid reservoir 16 toward the confinement 18.

A mass or actuator member 26 is movable in response to the occurrence of an accident to impact with firing pins 42 and thereby effect operation of the valve 24 to the open condition of FIG. 3. The mass 26 is impacted against the valve 24 under the influence of forces resulting from a change in momentum associated with the vehicle encountering an accident. The mass 26 is located on a guiding rod 48 which is operable to guide the movement of the mass 26 which the mass moves in response to a change in momentum of the vehicle during an accident. A suitable biasing means, such as a spring 50 is provided to bias the mass 26 toward a position in which it is spaced apart from the valve 24. The spring 50 is tapered to prevent engagement of the spring with a wall portion 52 of a connector 54 for mounting the mass 26 and flow control valve assembly 28 on the reservoir 16.

The arrow A shows the direction of travel of the vehicle before the occurrence of an accident. If, for example, the vehicle is engaged in a head-on accident from the direction in which arrow A points, the mass 26 will moves to the right of the position illustrated in FIG. 2. If the accident is of a sufficient magnitude in which it is desired to operate the safety apparatus 12 then the change in momentum of the vehicle will cause the mass 26 to overcome the biasing effect of the spring 50 and move to the right to impact with the firing pins 42. The impact of the mass 26 against the firing pins 42 effects actuation of the detonators 40 disposed in the percussion actuated explosive valve 24. It should be realized that the combination of the spring rate of the spring 50 and the weight of the mass 26 determines the conditions under which the sensor mass is impacted against the percussion actuated explosive valve 24. Preferably, the spring 50 would have a preload which is two to five times the weight of the mass 26. This prevents the sensor mass from actuating the explosive valve during nonaccident conditions and during conditions wherein the vehicle encounters abnormal road conditions. Moreover, the weight of the mass 26 is preferably sufficient to effect actuation of the firing pins 42 and the detonators 40 at a velocity of 15 feet per second. Thus, upon the occurrence of a sufficient change in momentum of the vehicle caused by an accident of a predetermined magnitude, the sensor mass 26 will slide along the guide rod 48 and initiate actuation of the percussion actuated valve 24 to effect a flow of fluid 17 from the fluid reservoir 16.

The flow control assembly 28 tends to stabilize the flow of fluid from the fluid reservoir 16 to the confinement 18. The flow control assembly 28 includes a flow control valve 56 which is operated from a closed condition (FIG. 2) blocking fluid flow to the confinement 18 to a fully open condition (FIG. 4) enabling fluid to flow to the confinement 18 by fluid pressure against a valve member 57. In the closed condition, the valve member 57 engages a valve seat 58 formed on the connector 54.

Upon operation of the explosive valve 24 to the open condition (FIG. 3) fluid flows from the reservoir 16 and presses against the valve member 57. This fluid pressure tends to operate the flow control valve 56 to the open condition. In assemblies which do not include the flow control valve 56, fluid flows at an extremely high rate into the confinement 16 and quickly expands the confinement. This is illustrated graphically in FIG. 9 wherein this flow of fluid is approximated by the solid line 59. It should be noted that the flow of fluid quickly reaches a maximum, indicated by the peak 60, and then decays as the fluid pressure in reservoir 16 decreases. The transient maximum flow rate corresponding to the peak 60, causes the confinement 18 to be expanded at a relatively high rate. This high rate of expansion of the confinement 18 can result in a severe impact of the confinement against an occupant of the vehicle.

To provide for a more uniform rate of expansion of the confinement 18, an assembly 61 retards operation of the flow control valve 56 to the fully open condition so that the rate of fluid flow from the reservoir 16 is at least partially stabilized. This is illustrated by the dashed curve 62 in FIG. 9. It should be noted that the dashed curve 62 represents the same volume of fluid flow as is represented by the curve 59. However, the flow represented by the dashed curve 62 tends to stabilize at a relatively low maximum value represented by the relatively flat portion 63 of the curve.

The assembly 61 includes a movable cylinder portion 65 which cooperates with a fixed piston 66 to form a chamber 67 therebetween. The cylinder portion 65 is moved toward the left as viewed in FIG. 2 upon operation of the control valve 56 from the closed condition toward the fully open condition of FIG. 4. Since the cylinder portion 65 is connected directly to the valve member 57, the distance through which the cylinder portion is moved is directly proportional to the extent of operation of the control valve 56 from the closed condition of FIG. 2.

A substantially incompressible fluid 68 is disposed within a chamber 67. Preferably, the incompressible fluid 68 is an inert fluid such as silicone oil or grease. Movement of the cylinder portion 65 effects a decrease in size of the chamber 67. However, the substantially incompressible fluid 68 tends to retard movement of the cylinder portion 65 which decreases the size of the chamber 67.

Suitable outlet means in the form of a restricted outlet passage 70 is provided to release the fluid 68 from the chamber 67. A seal member 71 is normally disposed over the outlet passageway 70 and prevents fluid flow therethrough. The seal member is preferably a plastic filler plug which is rupturable under a high pressure. A seal ring 76, preferably an elastomer seal ring, is disposed around the cylinder portion 62 and prevents leakage of fluid 68 from the chamber 67.

A valve member 72 is connected with the cylinder portion 65 and is operable to move therewith. The valve member 72 is disposed so that it moves into the outlet passage 70 upon movement of the cylinder portion 65 in response to operation of the flow control valve 56. The valve portion 72 is a metering valve and has a notch 74 therein. Movement of the cylinder portion 65 effects a rupture of the seal 71 by the valve member 72.

Figure 4:
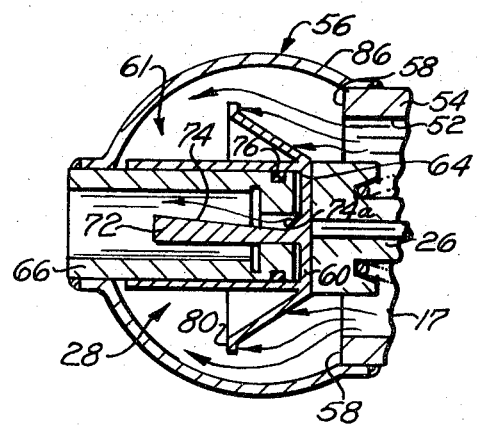
FIG. 4 is an enlarged view of a valve assembly for controlling the rate of fluid flow into the confinement, the valve assembly being shown in a fully open condition.

Release of fluid from the fluid reservoir 16 applies a fluid pressure to the valve member 57. This will effect an initial movement of the cylinder portion 65 to the left as viewed in FIG. 2. Movement of the cylindrical portion 65 to the left effects movement of the valve member 72 which in turn ruptures the seal 71 disposed over the outlet passageway 70. It should be realized that the notch 74 on the valve member 72 is operable to control the flow of the substantially incompressible fluid 68 through the outlet passageway 70. Initially, after the seal 71 is broken, the notched valve member 72 substantially blocks fluid flow through the outlet passageway 70. FIG. 2 illustrates the valve member 72 after a small initial movement thereof and it can be readily observed that an opening 73 between the valve member 72 and outlet 70 has a small cross-sectional area. Therefore, the cylinder portion 65 will encounter a large retarding force by the incompressible fluid 68 as it moves toward the left as only a minimal amount of fluid 68 will exit the chamber 67. However, as the valve member 72 moves toward the left, as illustrated in FIG. 3, greater amounts of fluid 68 will be allowed to flow through the outlet passageway 70 as the opening 73 increases in a cross-sectional area. FIG. 4 illustrates a wide portion 74a of the timing notch 74 in the outlet passageway 70 after the valve member 72 has moved farther to the left. Clearly, the opening 73 increases the cross-sectional area as the valve member 72 moves toward the left and the wide portion 74a of the notch 74 enters the outlet passageway 70. When the wide portion 74a of the timing notch 74 enters the passageway 70, the valve member 72 is in a fully open condition (FIG. 4) and provides a minimum resistance to fluid flow from the reservoir 16.

The connector 54 operates to direct the flow of fluid from the fluid reservoir toward the flow control assembly 28 when the percussion actuated explosive valve 24 is activated. When fluid flows from the fluid reservoir 16 through the connector 54, it engages the valve member 57. When the fluid pressure acting on the valve member 57 effects movement of the cylinder portion 65 to the left, as illustrated in FIG. 3. A small opening is then formed between the valve member 57 and the valve seat 58 on the connector member 54. This opening allows fluid to flow from the connector 54 to a distributor tube 86 which is connected in fluid communication with the confinement 18. Since the valve member 57 has been moved away from the valve seat 58 for only a relatively small distance, fluid flows into the confinement 18 at a relatively low rate to initiate expansion of the confinement.

Continued movement of the valve member 57 toward the fully open position of FIG. 4 is retarded by the assembly 61. As the fluid pressure in connector 54 increases, the cylinder portion 65 is moved toward the left and the seal means 71 is broken. This enables a small flow of the substantially incompressible fluid 68 through the outlet 70. As the opening between the valve seat 58 and the valve member 57 increases, the flow of fluid 17 from the fluid reservoir 16 to the confinement 18 also increases and the flow of the substantially incompressible fluid 68 through the outlet means 70 will also substantially increase. Thus, it can be seen that initially a small amount of fluid 17 from the fluid reservoir 16 will move toward the confinement. However, this fluid will be under a very large pressure. Further movement of the valve portion 60 will effect a larger flow of the fluid to the confinement 18, but this fluid will be under a substantially lower pressure as a portion of the fluid from the fluid reservoir will have already entered the interior of the confinement 18, thus decreasing the volume of fluid 17 remaining in the fluid reservoir 16 and the connector 54. Since the volume of fluid 17 remaining in the connector 54 and the reservoir 16 is reduced and the volume of the reservoir 16 and the connector 54 remain substantially constant, the remaining fluid will have a lower pressure. Therefore, the flow of fluid into the confinement will be at a substantially uniform flow rate. In other words, as the pressure of the fluid 17 remaining in the reservoir 16 and the connector 54 decreases, the opening between the valve member 57 and the valve seat 58 will increase as the cylinder portion 65 moves to the left and the substantially incompressible fluid 68 continues to flow from the chamber 67.

Figure 9:
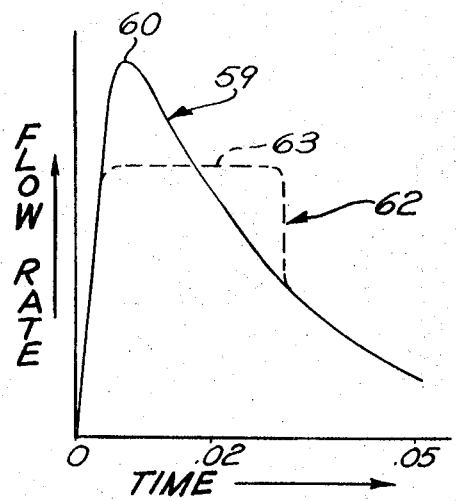
FIG. 9 is a graphical illustration contrasting a controlled flow of fluid into a confinement with an uncontrolled flow of fluid into a confinement.

The flow control valve 28 which initially retards fluid flow to the confinement 18 acts to minimize the noise level associated with the expansion of the confinement 18 and also minimizes the initial impact between the confinement 18 and the occupant. As shown in FIG. 9, the prior art safety apparatus effects expansion of the confinement in a manner represented by the curve 59 wherein the fluid flow into the confinement tends to rapidly reach a maximum value and then rapidly decrease. In the known safety apparatus, the flow of fluid into the confinement takes place over a fixed time period of approximately 0.05 seconds, however, the majority of the fluid flow is concentrated in the beginning of the time period, i.e., approximately 0.02 seconds and thus, an extremely rapid initial expansion of the confinement takes place. Associated with this extremely rapid initial expansion and the extremely high flow rate in the known safety apparatus is a very high noise level which may be detrimental to the ears of the occupant of the vehicle. Moreover, the extremely high flow rate at the beginning of the expansion period effects an extremely rapid initial expansion of the confinement. This rapid initial expansion of the confinement may tend to cause severe impact forces between the confinement and the occupant. The control valve 28 tends to stabilize the flow of fluid into the confinement over the fixed period of time, as is illustrated by the curve 62 in FIG. 9. It should be noted from the curve 62 that, while total time for the expansion of the confinement 18 is essentially the same as that for the known safety apparatus represented by the curve 59, the flow rate tends to be more uniform. The control valve 28, therefore, utilizes the same total time period for expansion of the confinement but the flow rate during this time period is more uniform and has a substantially lower maximum flow rate. By reducing the maximum flow rate into the confinement, the noise level associated with the expansion of the confinement is thereby reduced. Moreover, by reducing the maximum flow rate, the initial expansion of the confinement takes place at a substantially lower speed than the initial expansion of the confinement in the prior art. This tends to minimize impact forces between the occupant and the expanding confinement. While the flow control valve 28 has been illustrated as associated with a fluid reservoir having a pressurized fluid stored therein it should be obvious that the valve 28 could also be effectively utilized with a fluid supply of gas generating material.

Figure 7:
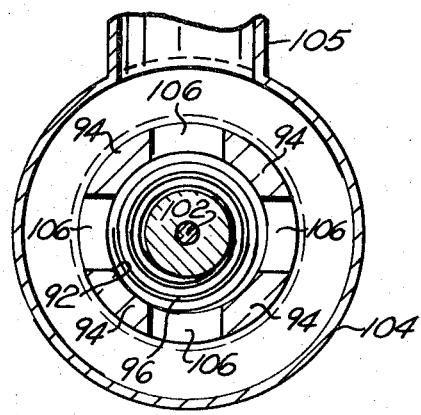
FIG. 7 is a sectional view taken along the sectional line 7—7 of FIG. 6 and illustrating the mounting of a mass for actuating an explosive valve in the assembly of FIG. 6.
Figure 6:
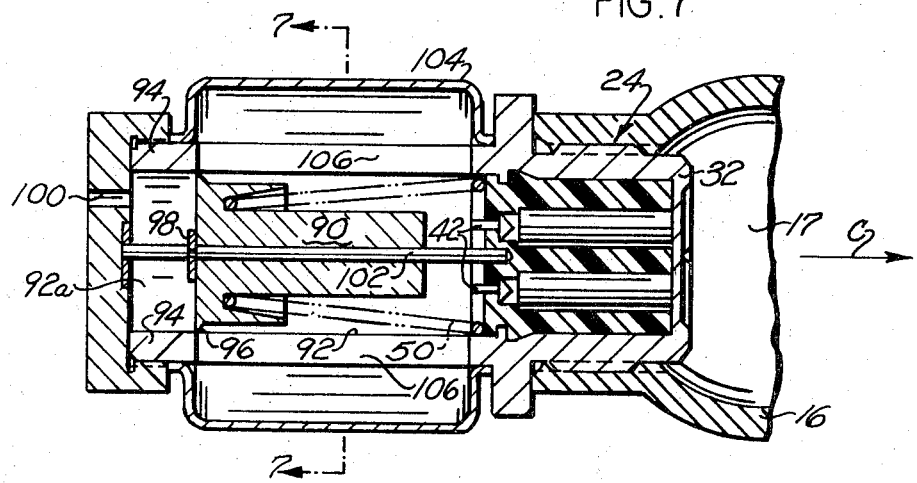
FIG. 6 illustrates another embodiment of the unitary assembly for establishing a flow of fluid in response to the occurrence of an accident.

Another embodiment of the present invention is illustrated in FIG. 6 wherein the explosively actuated valve 24 is associated with a sensor mass 90. The sensor mass 90 is disposed within a chamber 92. The chamber 92 has wall portions 94 thereof which substantially surround the sensor mass 90. The mass 90 is constructed so that it has a suitable seal edge 96 which cooperate with the walls 94 of the chamber 92 and provide a fluid seal therebetween. A suitable tapered spring 50 is provided to bias the sensor mass 90 and to prevent actuation of the percussion actuated explosive valve 24 during a non-accident condition. The spring 50 biases the sensor mass against a shear-type C-ring 98 and holds the sensor mass in its unactuated position, illustrated in FIG. 6, during non-accident conditions. The chamber 92 is provided with a suitable outlet vent 100 which is operable to relieve pressure in the left portion 92a of the chamber 92 in the event of movement of the mass 90. A suitable guiding rod 102 is disposed in the chamber 92 and is operable to guide movement of the mass 90 toward the firing pins 42 of the percussion actuated explosive valve 24. A manifold 104 is disposed around the wall portion 94 of the chamber 92 and is connected in fluid communication with the interior of the confinement 18 by a duct 105. The wall portion 94 of the chamber 92 has a plurality of fluid ports 106 therein which provide for fluid communication between the manifold 104 and the chamber 92. Preferably, the fluid ports 106 are symmetrical as illustrated in FIG. 7 and provide for minimum reaction during actuation of the safety apparatus 12.

The vehicle in which the safety apparatus is utilized is assumed to be moving forewardly in the direction of arrow C prior to an accident. Upon the occurrence of an accident, the vehicle decelerates and the change in momentum of the vehicle causes the mass 90 to move against the biasing force of the spring 50 and the mass 90 engages the firing pins 42 to effect actuation of the percussion actuated explosive valve 24. Preferably, the mass 90 travels between 0.25 and 0.50 inches to effect actuation of the percussion actuated explosive valve 24. Actuation of the percussion actuated explosive valve 24 effects a flow of fluid 17 from the fluid reservoir 16 into the chamber 92. This flow of fluid and the biasing effect of the spring 50 moves the sensor mass 90 to the left and breaks the shear C-ring 98. The breaking of the shear ring 98 allows the mass 90 to move to the left to close the outlet vent 100 and prevent fluid flow therethrough. The seal edges 96 on the mass 90 provide for sealing of the fluid 17 from the fluid reservoir 16 in the chamber 92 as the mass 90 moves to the left to prevent the flow of fluid from the fluid reservoir through the outlet means 100 which are vented to the atmosphere upon initial actuation of the valve 24. As the mass 90 moves to the left, the fluid in the chamber 92 will exit there from through the ports 106 to the manifold 104. It should be noted that the expansion means illustrated in FIG. 6 is non-electric expansion means and is not subject to the reliability problems associated with electric circuits. Moreover, the expansion means is a self-contained unit and is constructed so that its reliability is maximized. Thus, a self-contained mechanical actuation system for a safety apparatus has been provided.

Figure 8:
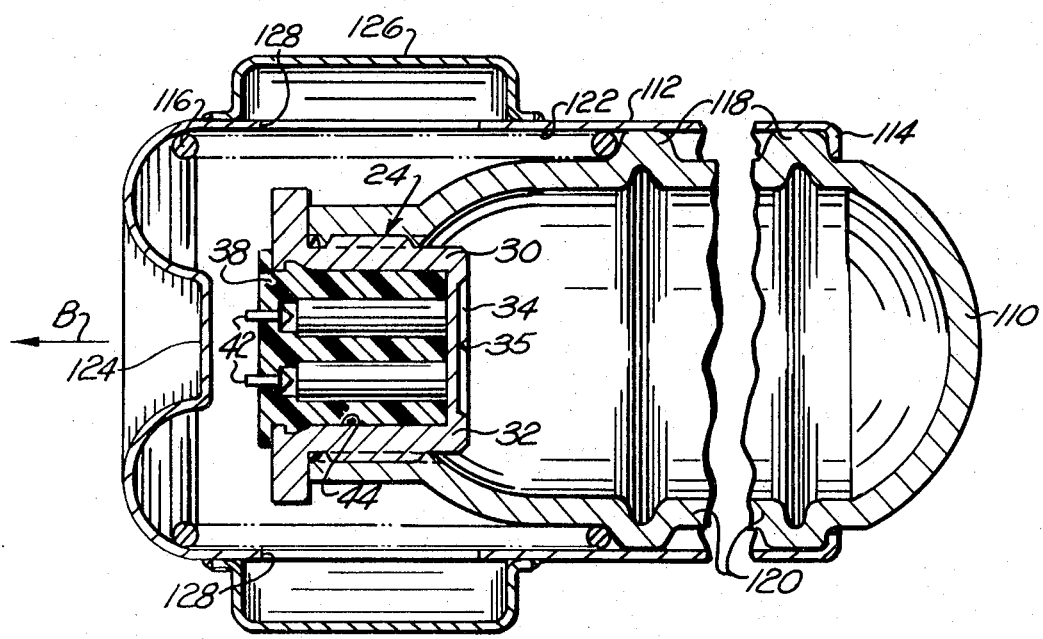
FIG. 8 is another embodiment of the present invention wherein a source of fluid is moved in response to the occurrence of an accident to impact a fixed actuator member with a percussion actuated explosive valve.

A further embodiment of the present invention is illustrated in FIG. 8, which shows a fluid reservoir 110 disposed within a container 112. The fluid reservoir 110 includes a percussion actuated explosive valve 24 disposed on one end thereof. The reservoir 110 is operable to move longitudinally within the interior of the container 112 and is normally biased against a stop portion 114 of the confinement 112 by a spring means 116. Preferably, the spring member is a low rate spring having a preload of two and one-half to five times that of the reservoir weight. Suitable guiding members 118 are disposed on the walls 120 of the reservoir 110 and cooperate with the sides 122 of the container 112 to guide longitudinal movement of the reservoir 110. The guides 118 also cooperate with the wall portions 122 to prohibit the flow of fluid therebetween when fluid flow from the reservoir 110 is initiated.

The present embodiment is mounted on the vehicle so that the direction of travel of the vehicle is generally in the direction of arrow B. However, when the vehicle encounters an accident, the momentum of reservoir 110 and the percussion actuated explosive valve will move them to the left. Movement of the reservoir 110 and the valve 24 to the left will impact an actuator portion 124 of the container 112 with the firing pins 42. Impacting of the firing pins 42 and the actuator portion 124 effects actuation of the percussion actuated explosive valve 24 to the open condition and allows fluid to flow from the fluid reservoir 110 into the interior of the container 112. The combination of the fluid flow from the reservoir 110 and the biasing effect of the spring 116 will then effect movement of the reservoir to the right so that it engages the stop portion 114. The interior of the container 112 is in communication with a manifold member 126 by means of orifices 128 disposed on the walls 122 of the container 122. Thus, when the explosive actuated valve is actuated, the fluid will flow into the container 112 from the fluid reservoir 110, through the openings 128 and into the gas manifold 126. The gas manifold is in fluid communication with the interior of the expandable confinement 18 by suitable means, such as a distributor tube. Thus, it can be seen that upon the occurrence of an accident, the change in momentum of the vehicle will effect movement of the fluid reservoir 110 and the percussion actuated explosive valve 24 to effect actuation of the explosive valve and expansion of the confinement.

In the embodiment illustrated in FIG. 8, the reservoir 110 and the explosive valve 24 combine to form a sensor mass that is moved in response to change in momentum of the vehicle effected by the occurrence of an accident. Therefore, a non-electrical self-contained unit for effecting expansion of the confinement has been provided. Moreover, the need for a separate sensor mass has been eliminated and a compact and economical system has been provided. It should be realized that in this embodiment and the other embodiments, the preload biasing force which the spring exerts against the sensor mass, in this case the reservoir 110 and the explosive actuated valve 24, and the weight of the sensor determines the minimum change in momentum in which the apparatus will effect expansion of the confinement.

From the hereinabove disclosure a new and improved safety apparatus for protecting an occupant of a vehicle has been provided. The safety apparatus includes an expandable confinement 18 having a collapsed condition and an expanded condition for restraining movement of an occupant relative to the vehicle during an accident. Expansion of the confinement 18 is effected by flow of a fluid from a fluid supply. In the specific illustrated embodiments, a fluid reservoir having a supply of pressurized fluid therein is used, but it should also be contemplated that a gas generating material could be utilized in the present invention. Associated with the fluid supply is a percussion actuated explosive valve 24 which is operable to open the fluid supply and release the supply of fluid therefrom upon the occurrence of an accident. A sensor mass is movable in response to a change in momentum effected by an accident to actuate the percussion actuated explosive valve 24 upon the occurrence of an accident. The sensor mass operates in response to a change in momentum of the vehicle and is associated with suitable biasing means so that the percussion actuated explosive valve is actuated only during predetermined accident conditions. Suitable flow control means, such as a flow control valve 28 is utilized to retard the flow of fluid from the fluid reservoir into the confinement. The flow control means minimizes noise associated with the expansion of the confinement and minimizes the initial impact between the expanding confinement and the occupant. Moreover, the combination of the percussion actuated explosive valve and the sensor mass provide for a reliable non-electrical system which is a self-contained compact unit.

Having described my invention so as to enable one of ordinary skill in the art to practice it, I now claim:

1. A safety apparatus for protecting an occupant of a vehicle during an accident, said safety apparatus comprising a confinement having a collapsed condition and an expanded condition for restraining an occupant of a vehicle, means actuatable for supplying fluid for inflating said confinement, conduit means defining a flow path for conducting the supplied fluid from said means for supplying fluid to said confinement, and valve means disposed in said conduit means, said valve means including means operably responsive to pressure in said flow path for controlling the rate of fluid flow therethrough.

2. The apparatus of claim 1 wherein said means responsive to pressure in said flow path includes a member movable in response to fluid pressure in said flow path and operable to at least partially control the rate of fluid flow through said flow path.

3. The apparatus of claim 1 wherein said valve means includes a valve member and a valve seat, said valve member being movable relative to said valve seat, said valve member and said valve seat having surfaces defining a flow path therebetween which progressively increases in size as said valve member moves away from said valve seat in response to pressure in said flow path.

4. The apparatus of claim 3 wherein said means actuatable for supplying fluid comprises a reservoir containing fluid under pressure and an explosive valve operable to open said reservoir for allowing fluid to flow therefrom.

5. A safety apparatus for protecting an occupant of a vehicle during an accident, said safety apparatus comprising a confinement having a collapsed condition and an expanded condition for restraining an occupant of a vehicle, a fluid supply actuatable to supply fluid for use in expanding said confinement, conduit means connecting said confinement with said source of fluid and defining a flow path therebetween, and valve means disposed within said conduit means in said flow path said valve means being operable between a closed condition at least partially blocking fluid flow through said flow path and an open condition enabling fluid to flow through said flow path, said valve means being operated to said open condition in response to fluid pressure in said flow path wherein said valve means is operable to at least partially control the rate of expansion of said confinement.

6. The apparatus of claim 5 wherein said valve means includes a valve member and a valve seat, said valve member being movable relative to said valve seat, said valve member and said valve seat having surfaces defining a flow path therebetween which progressively increases in size as said valve member moves away from said valve seat in response to pressure in said flow path.

7. The apparatus of claim 5 wherein said fluid supply actuatable to supply fluid comprises a reservoir containing fluid under pressure and an explosive valve operable to open said reservoir upon actuation thereof for allowing fluid to flow from said reservoir for inflating said confinement.

* * * * *

UNITED STATES PATENT OFFICE
CERTIFICATE OF CORRECTION

Patent No. 3,862,767           Dated 1/28/75

Inventor(s) Richard Chute

It is certified that error appears in the above-identified patent and that said Letters Patent are hereby corrected as shown below:

In the Abstract:
line 14:              "flow of" should read "valve".
line 16:              After "flow" insert "of".

Col. 4, line 15:      "which" should read "such".

Col. 5, line 15:      "which" should read "when".

Col. 10, line 26:     "122" should read "112".

Signed and sealed this 8th day of April 1975.

(SEAL)
Attest:

RUTH C. MASON
Attesting Officer

C. MARSHALL DANN
Commissioner of Patents
and Trademarks